(12) United States Patent
Kim et al.

(10) Patent No.: US 9,557,190 B2
(45) Date of Patent: Jan. 31, 2017

(54) CALIBRATION APPARATUS AND METHOD FOR 3D POSITION/DIRECTION ESTIMATION SYSTEM

(71) Applicant: Samsung Electronics Co., Ltd., Suwon-si (KR)

(72) Inventors: Sang Hyun Kim, Yongin-si (KR); Hyong Euk Lee, Yongin-si (KR); Chang Kyu Choi, Seongnam-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 437 days.

(21) Appl. No.: 13/666,518

(22) Filed: Nov. 1, 2012

(65) Prior Publication Data

US 2013/0253869 A1     Sep. 26, 2013

(30) Foreign Application Priority Data

Mar. 26, 2012   (KR) .................. 10-2012-0030477

(51) Int. Cl.
| | |
|---|---|
| G01S 5/02 | (2010.01) |
| G01S 5/04 | (2006.01) |
| G01S 5/16 | (2006.01) |
| G01C 25/00 | (2006.01) |
| G01C 15/00 | (2006.01) |

(52) U.S. Cl.
CPC ............ *G01C 25/00* (2013.01); *G01C 15/002* (2013.01); *G01S 5/021* (2013.01); *G01S 5/0252* (2013.01); *G01S 5/04* (2013.01); *G01S 5/16* (2013.01)

(58) Field of Classification Search
CPC ..... G01C 25/00; G01C 15/002; G01S 5/0252; G01S 5/04; G01S 5/16

USPC ........................................................ 702/94
See application file for complete search history.

(56) References Cited

U.S. PATENT DOCUMENTS

| | | | |
|---|---|---|---|
| 7,931,535 B2* | 4/2011 | Ikeda et al. ..................... 463/38 |
| 2005/0077085 A1* | 4/2005 | Zeller et al. .................... 175/45 |
| 2007/0080940 A1* | 4/2007 | Aoki et al. ..................... 345/158 |
| 2008/0106517 A1* | 5/2008 | Kerr et al. ..................... 345/158 |
| 2008/0291160 A1* | 11/2008 | Rabin .......................... 345/156 |
| 2009/0295719 A1 | 12/2009 | Choi |
| 2010/0093435 A1* | 4/2010 | Glaser et al. ................... 463/36 |
| 2011/0026364 A1* | 2/2011 | Lee et al. ...................... 367/127 |
| 2011/0261270 A1* | 10/2011 | Bang et al. .................... 348/734 |

FOREIGN PATENT DOCUMENTS

| | | |
|---|---|---|
| JP | 6-103360 | 4/1994 |
| KR | 10-0813998 | 3/2008 |

(Continued)

OTHER PUBLICATIONS

Daniel Roetenberg, "Inertial and Magnetic Sensing of Human Motion", 2006.*

*Primary Examiner* — Janet Suglo
(74) *Attorney, Agent, or Firm* — NSIP Law (57) ABSTRACT

Provided is a calibration apparatus and method of a three-dimensional (3D) position and direction estimation system. The calibration apparatus may receive inertia information and intensity information during a predetermined period of time, may calculate distances between a transmitter and the respective receivers, and may calibrate a signal attenuation characteristic of each receiver using the distances between the transmitter and the respective receivers.

21 Claims, 8 Drawing Sheets

(56) References Cited

FOREIGN PATENT DOCUMENTS

| | | |
|---|---|---|
| KR | 10-2009-0097415 | 9/2009 |
| KR | 10-2009-0099300 | 9/2009 |
| KR | 10-2009-0126182 | 12/2009 |
| KR | 10-2010-0096257 | 9/2010 |
| KR | 10-2010-0120270 | 11/2010 |
| KR | 10-2011-0021249 | 3/2011 |
| KR | 10-2011-0039318 | 4/2011 |
| WO | WO 2005/108119 A2 | 11/2005 |
| WO | WO 2010/002997 A1 | 1/2010 |

* cited by examiner

CALIBRATION APPARATUS AND METHOD FOR 3D POSITION/DIRECTION ESTIMATION SYSTEM

CROSS-REFERENCE TO RELATED APPLICATIONS

This application claims the priority benefit of Korean Patent Application No. 10-2012-0030477, filed on Mar. 26, 2012, in the Korean Intellectual Property Office, the disclosure of which is incorporated herein by reference.

BACKGROUND

1. Field

Embodiments relate to a calibration apparatus and method of three-dimensional (3D) position and direction estimation system, and more particularly, to an apparatus and method for calibrating a signal attenuation characteristic in a 3D position/direction estimation apparatus and method based on intensity information.

2. Description of the Related Art

Technology for estimating a three-dimensional (3D) position and a direction of a moving object or target may be used to sense a motion of an object, a human body, an animal, and the like within a 3D space using expensive and large motion capturing equipment in the field of graphics/animation industries and the like.

Consumer electronics (CE) motion sensing technology associated with game industry is gaining attention and thus, many 3D position and direction estimation methods using inexpensive and small motion capturing devices have been developed.

For example, a method of estimating a 3D position in a space may generally include a method of using a camera, a method of using an infrared ray, and a method of using an inertia sensor.

In the case of using a camera, it is possible to convert a position of a marker/light source focused within a camera image to a spatial 3D position using a plurality of two-dimensional (2D) cameras. However, accuracy depends on a camera resolution, a marker size, and the like. Thus, it is difficult to perform highly accurate sensing.

In the case of using an ultrasonic wave, when time of flight (TOF) of an ultrasonic wave from a transmitter to a receiver is measured using an aspect that an ultrasonic wave moves at the velocity of sound, for example, about 340 m/s in the air, a distance may be calculated. When information about at least three same view distances is obtained, the 3D position may be calculated. In the case of using an ultrasonic wave, it is possible to perform highly precise sensing with inexpensive equipment compared to expensive equipment such as a camera. However, due to interference between sound waves, signals may not be simultaneously transmitted. Considering an ultrasonic signal attenuation time, for example, about 100 m/sec for 3 m, it may be difficult to estimate a position of a moving object in real time.

In the case of using an inertia sensor, it is possible to estimate a 3D position by integrating acceleration, motion and gravitation acceleration that are obtained using a gyro sensor, and a motion acceleration component that is calculated using angular velocity. However, errors may be accumulated over time. That is, the above method may perform a position estimation only within a short time interval and thus, may not be suitable for the position estimation within a long time interval.

To solve the above problems, a method of estimating a 3D position and a direction using a signal attenuation characteristic of infrared ray is proposed. However, even in the case of using the signal attenuation characteristic, the signal attenuation characteristic may be differently sensed based on a characteristic of a receiver to receive a signal. Thus, the accuracy may be decreased.

SUMMARY

According to an aspect of one or more embodiments, there is provided a calibration apparatus for calibrating a signal attenuation characteristic in a three-dimensional (3D) position and direction estimation system, the calibration apparatus including an information selector to receive intensity information of a signal measured by each receiver during a predetermined period of time, to receive inertia information from a remote device during the same predetermined period of time, to select strongest intensity information for each receiver, and to verify inertia information of when the strongest intensity information is received, an angle calculator to calculate angles between a vector of a transmitter and vectors of the respective receivers based on the inertia information verified for each receiver, and a position calculator to calculate a 3D position of the remote device using a triangulation scheme based on the angles between the vectors.

The signal received by each receiver during the predetermined period of time may be a signal that is transmitted by the transmitter during the predetermined period of time while being rotated horizontally or vertically based on a fixed point.

The calibration apparatus may further include a distance calculator to calculate distances between the transmitter and the respective receivers, and a calibrator to calibrate the signal attenuation characteristic of each receiver based on the strongest intensity information of each receiver and the distances between the transmitter and the respective receivers.

The calibrator may calibrate the signal attenuation characteristic of each receiver based on the strongest intensity information of each receiver and information about the distances between the transmitter and the respective receivers that are measured at least twice at different positions.

The calibration apparatus may further include a posture calculator to calculate a posture of the remote device of when the strongest intensity information for each receiver is received, based on inertia information of when the strongest intensity information for each receiver is received. When calibrating the signal attenuation characteristic of each receiver, the calibrator may use a signal attenuation characteristic that varies based on an angle, using the posture of the remote device.

Here, at least three receivers may be provided.

Here, at least two transmitters that direct different directions may be provided.

The remote device may include an inertia sensor to measure the inertia information, and may include either the transmitter or the receivers.

The intensity information may include an intensity value of an optical signal that is emitted at a predetermined wavelength, or magnitude of an electromagnetic field.

The inertia information may include at least one of motion acceleration of three axes, gravity acceleration of the three axes, and angular speed of the three axes that are measured using an inertia sensor.

According to an aspect of one or more embodiments, there is provided a calibration method for calibrating a signal attenuation characteristic in a calibration apparatus of a 3D position and direction estimation system, the method including receiving intensity information of a signal measured by each receiver during a predetermined period of time, and receiving inertia information from a remote device during the same predetermined period of time, selecting strongest intensity information for each receiver, verifying inertia information of when the strongest intensity information is received, calculating angles between a vector of a transmitter and vectors of the respective receivers based on the inertia information verified for each receiver, and calculating a 3D position of the remote device using a triangulation scheme based on the angles between the vectors.

The signal received by each receiver during the predetermined period of time may be a signal that is transmitted by the transmitter during the predetermined period of time while being rotated horizontally or vertically based on a fixed point.

After calculating the 3D position of the remote device, the method may further include calculating distances between the transmitter and the respective receivers, and calibrating the signal attenuation characteristic of each receiver based on the strongest intensity information of each receiver and the distances between the transmitter and the respective receivers.

The calibrating may include calibrating the signal attenuation characteristic of each receiver based on the strongest intensity information of each receiver and information about the distances between the transmitter and the respective receivers that are measured at least twice at different positions.

The method may further include calculating a posture of the remote device of when the strongest intensity information for each receiver is received, based on inertia information of when the strongest intensity information for each receiver is received. The calibrating may include using a signal attenuation characteristic that varies based on an angle using the posture of the remote device, when calibrating the signal attenuation characteristic of each receiver.

According to an aspect of one or more embodiments, there is provided a system for estimating a 3D position and a direction, the system including a transmission apparatus including at least one transmitter to transmit a signal for intensity measurement, a reception apparatus including at least three receiver to receive the signal and to measure intensity of the signal, and to output intensity information, a remote device including an inertia sensor to measure inertia information, and including one of the transmission apparatus and the reception apparatus, and a calibration apparatus to receive the inertia information and the intensity information during a predetermined period of time, to calculate distances between the at least one transmitter and the at least three receivers, and to calibrate a signal attenuation characteristic of each receiver based on the distances between the at least one transmitter and the at least three receivers.

The calibration apparatus may include an information selector to receive intensity information of a signal measured by each receiver during a predetermined period of time, to receive inertia information from the remote device during the same period of time, to select strongest intensity information for each receiver, and to verify inertia information of when the strongest intensity information is received, an angle calculator to calculate angles between a vector of the at least one transmitter and vectors of the at least three receivers based on the inertia information verified for each receiver, a position calculator to calculate a 3D position of the remote device using a triangulation scheme based on the angles between the vectors, a distance calculator to calculate distances between the at least one transmitter and the at least three receivers, and a calibrator to calibrate the signal attenuation characteristic of each receiver based on the strongest intensity information of each three receiver and the calculated distances between the at least one transmitter and the at least three receivers.

The signal received by each receiver during the predetermined period of time may be a signal that is transmitted by the at least one transmitter during the predetermined period of time while being rotated horizontally or vertically based on a fixed point.

The calibrator may calibrate the signal attenuation characteristic of each receiver based on the strongest intensity information of each receiver and information about the distances between the at least one transmitter and the at least three receivers that are measured at least twice at different positions.

The 3D position and direction estimation system may further include a posture calculator to calculate a posture of the remote device of when the strongest intensity information for each receiver is received, based on inertia information of when the strongest intensity information for each receiver is received. When calibrating the signal attenuation characteristic of each receiver, the calibrator may use a signal attenuation characteristic that varies based on an angle, using the posture of the remote device.

Here, the at least three receivers may be provided.

Here, at least two transmitters that direct different directions may be provided.

According to an aspect of one or more embodiments, there is provided a calibration apparatus for calibrating a signal attenuation characteristic in a three-dimensional (3D) position and direction estimation system, the calibration apparatus including an information selector to receive intensity information of a signal measured by each receiver during a predetermined period of time, to receive inertia information from a remote device during the same predetermined period of time, to select strongest intensity information for each receiver, and to verify inertia information of when the strongest intensity information is received; an angle calculator, using at least one processor, to calculate angles between a vector of a first transmitter and vectors of the respective receivers based on the inertia information verified for each receiver and between a vector of a second transmitter and vectors of the respective receivers based on the inertia information verified for each receiver; and a position calculator to calculate a 3D position of the remote device using a triangulation scheme based on the angles between the first vector of the transmitter and the vectors of the respective receivers and the second vector of the transmitter and the vectors of the respective receivers.

According to an aspect of one or more embodiments, there is provided a calibration method for calibrating a signal attenuation characteristic in a calibration apparatus of a three-dimensional (3D) position and direction estimation system, the method including receiving intensity information of a signal measured by each receiver during a predetermined period of time, and receiving inertia information from a remote device during the same predetermined period of time; selecting strongest intensity information for each receiver; verifying inertia information of when the strongest intensity information is received; calculating, using at least one processor, angles between a vector of a first transmitter and vectors of the respective receivers based on the inertia information verified for each receiver; calculating, using at least one processor, angles between a vector of a second transmitter and vectors of the respective receivers based on the inertia information verified for each receiver; and calculating a 3D position of the remote device using a triangulation scheme based on the angles between the vectors.

According to an aspect of one or more embodiments, there is provided at least one non-transitory computer readable medium storing computer readable instructions to implement methods of embodiments.

Additional aspects of embodiments will be set forth in part in the description which follows and, in part, will be apparent from the description, or may be learned by practice of the disclosure.

BRIEF DESCRIPTION OF THE DRAWINGS

These and/or other aspects will become apparent and more readily appreciated from the following description of embodiments, taken in conjunction with the accompanying drawings of which.

DETAILED DESCRIPTION

Reference will now be made in detail to embodiments, examples of which are illustrated in the accompanying drawings, wherein like reference numerals refer to the like elements throughout. Embodiments are described below to explain the present disclosure by referring to the figures.

A signal may have an attenuation characteristic and thus, a measured intensity of a signal may vary based on a distance between a transmitter and a receiver, and a directional direction of each of the transmitter and the receiver. Even though there are some signals that have such attenuation characteristic, description will be made based on an infrared signal in the following.

Figure 1:
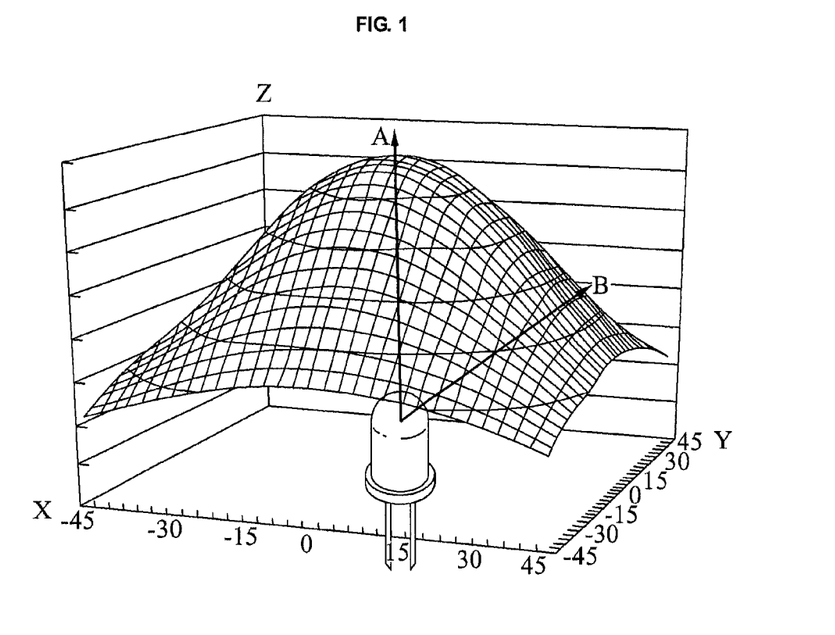
FIG. 1 illustrates a transmission directional characteristic of an infrared ray of which received intensity varies based on a transmission directional direction of an infrared signal according to an embodiment.

FIG. 1 illustrates a transmission directional characteristic of an infrared ray of which received intensity varies based on a transmission directional direction of an infrared signal according to an embodiment.

Referring to FIG. 1, an infrared ray has a characteristic that a received intensity of the infrared ray varies based on a direction angle of a transmitter, that is, a directional direction of an infrared signal in a predetermined distance. In FIG. 1, Z axis denotes intensity of a transmission infrared ray, and each of X axis and Y axis denotes a measurement angle measured by the transmitter. In the following description, the transmission directional characteristic indicates a characteristic of an infrared ray that a received intensity varies based on a direction into which an infrared signal is transmitted by the transmitter.

Figure 2:
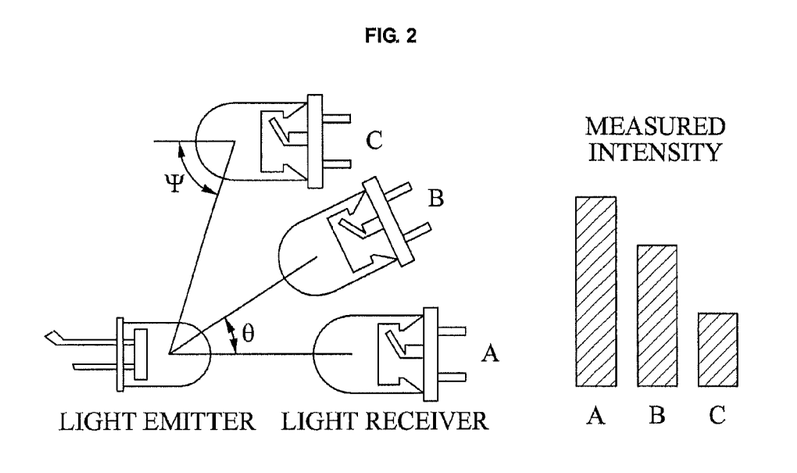
FIG. 2 illustrates a transmission directional characteristic and a reception directional characteristic of an infrared signal according to an embodiment.

FIG. 2 illustrates a transmission directional characteristic and a reception directional characteristic of an infrared signal according to an embodiment.

Referring to FIG. 2, when comparing a received intensity of A and a received intensity of B, it can be known that a received intensity of the infrared signal varies based on a transmission directional direction angle θ. The received intensity of the infrared signal may also be affected by a reception directional direction angle ψ that is a direction from which a receiver receives the infrared signal. In the following description, the reception directional characteristic indicates a characteristic of an infrared ray that a received intensity varies based on a direction from which the infrared ray is received by the receiver.

Signal intensity measured based on a distance between a transmitter and the receiver may have a characteristic as expressed by Equation 1:

$$I \propto \frac{1}{r^2} \qquad \text{[Equation 1]}$$

In Equation 1, I denotes the measured signal intensity, and r denotes the distance between the transmitter and the receiver.

Based on a directional direction of the transmitter, the measured signal intensity may have a characteristic as expressed by Equation 2.

$$I \propto \cos(K\theta) \qquad \text{[Equation 2]}$$

In Equation 2, I denotes the measured signal intensity, κ denotes a variable indicating an attenuation characteristic of the transmitter, and θ denotes a direction angle directed by the transmitter.

The signal intensity measured based on a directional direction of the receiver may have a characteristic as expressed by Equation 3.

$$I \propto \cos(\lambda\psi) \qquad \text{[Equation 3]}$$

In Equation 3, I denotes the measured signal intensity, λ denotes a variable indicating an attenuation characteristic of the receiver, and ψ denotes a direction angle directed by the receiver.

Using all of the characteristics based on the distance between the transmitter and the receiver, the directional direction of the transmitter, and the directional direction of the receiver, signal intensity of the infrared ray may be measured according to Equation 4.

$$I = \alpha \cos(\kappa\theta) \cdot \frac{1}{r^2} \cdot \cos(\lambda\psi) \qquad \text{[Equation 4]}$$

In Equation 4, I denotes the measured signal intensity, r denotes the distance between the distance between the transmitter and the receiver, α denotes a scale factor using characteristics of the transmitter and the receiver, κ denotes the variable indicating the attenuation characteristic of the transmitter, θ denotes the direction angle directed by the transmitter, λ denotes the variable indicating the attenuation characteristic of the receiver, and ψ denotes the direction angle directed by the receiver.

Figure 3:
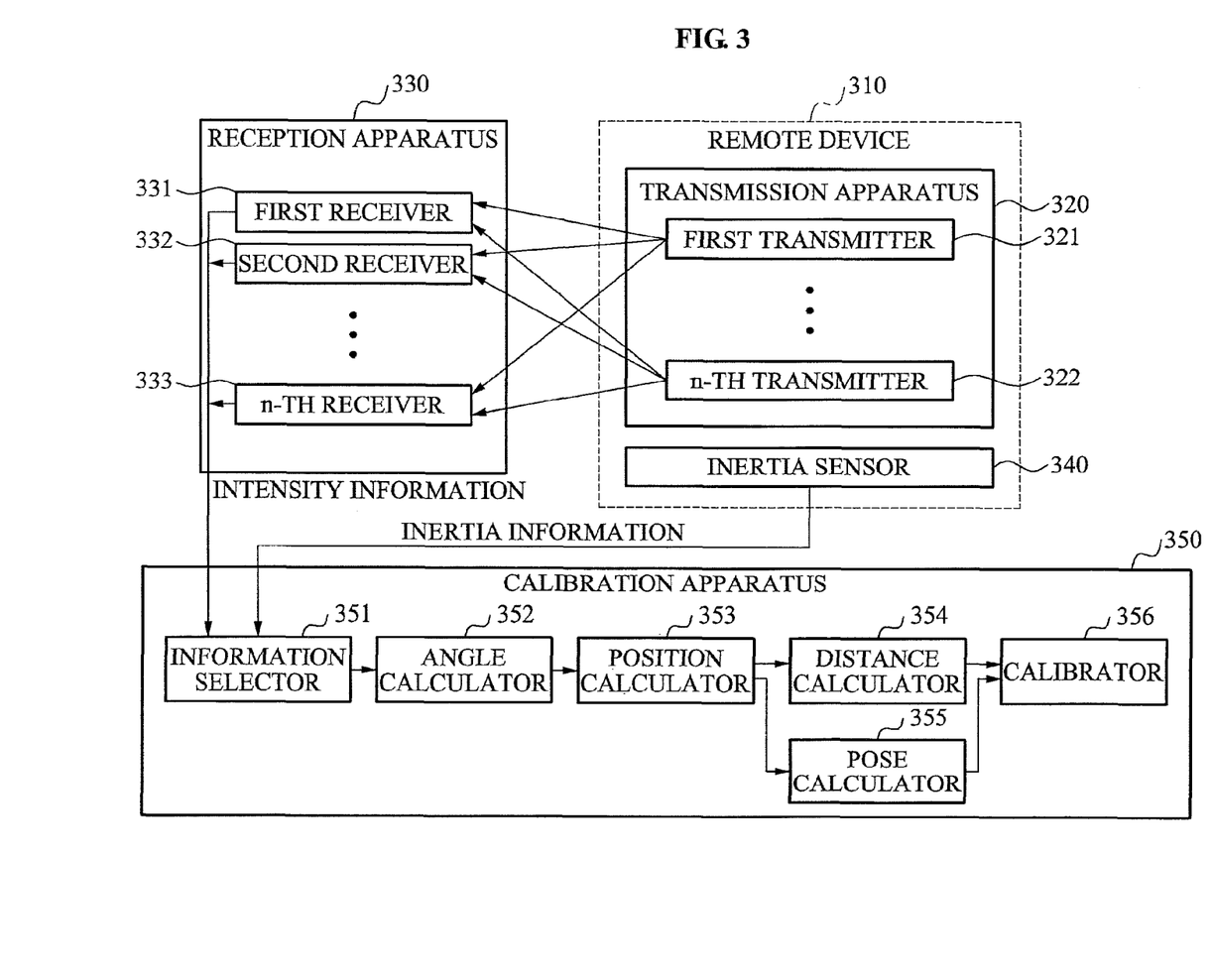
FIG. 3 illustrates a configuration of a calibration apparatus in a three-dimensional (3D) position and direction estimation system according to an embodiment.

FIG. 3 illustrates a configuration of a calibration system (apparatus) 350 in a 3D position and direction estimation system according to an embodiment.

Referring to FIG. 3, the 3D position and direction estimation system may include a remote device 310, a transmission apparatus 320, a reception apparatus 330, and the calibration apparatus 350. The 3D position and direction estimation system may further include an estimation apparatus (not shown) to estimate a 3D position and a direction based on information received from the remote device 310 and the reception apparatus 330.

The remote device 310 may be a target device of which a position and a direction are to be estimated, and may include the transmission apparatus 320 and an inertia sensor 340 to measure inertia information. The inertia sensor 340 may include at least one of an acceleration sensor, a terrestrial magnetism sensor, and a gyro sensor. The inertia information may include information about at least one of motion acceleration of three axes, gravity acceleration of the three axes, and angular speed of the three axes. Even though the remote device 310 includes the transmission apparatus 320 in FIG. 3, the remote device 310 may include the reception apparatus 330 instead of including the transmission apparatus 320. That is, the remote device 310 may include either the transmission apparatus 320 or the reception apparatus 330.

The transmission apparatus 320 may include at least one transmitter, for example, a first transmitter 321, ..., an n-th transmitter 322.

Each transmitter may transmit a signal. Here, when the transmission apparatus 320 includes at least two transmitters, directional directions of the at least two transmitters, for example, the first transmitter 321, ..., the n-th transmitter 322, may be different from each other and an angle between the directional directions may be predetermined. A signal transmitted from each transmitter may be an optical signal and may also be an electromagnetic field. As a representative example of the optical signal, an infrared ray may be used. When each transmitter transmits an optical signal, each transmitter may be a light emitter. When each transmitter transmits an electromagnetic field, each transmitter may be an electromagnetic field transmitter. In the following, description will be made based on an example in which each transmitter transmits an optical signal.

One of at least one transmitter, for example, the first transmitter 321, ..., the n-th transmitter 322, may function as an infrared transmitter of a remote controller to control an electronic device.

The reception apparatus 330 may include at least one receiver, for example, a first receiver 331, a second receiver 332, ..., an n-th receiver 333.

Each receiver may receive a signal transmitted from each transmitter and measure intensity of the received signal. Here, when the reception apparatus 330 includes at least two receivers, for example, the first receiver 331, the second receiver 332, ..., the n-th receiver 333, a position and a directional direction of each receiver may be predetermined. That is, positions and direction of the receivers, for example, the first receiver 331, the second receiver 332, ..., the n-th receiver 333, may be set to be different from each other.

A signal received by each receiver may be an optical signal and may also be an electromagnetic field. When each receiver receives an optical signal, each receiver may be a light receiver. When each receiver receives an electromagnetic field, each receiver may be a magnetometer. In the following, description will be made based on an example in which each receiver receives an optical signal.

When the transmission apparatus 320 includes at least two transmitters, each receiver may identify each of the at least two transmitters based on a predetermined received order of a signal. When the transmission apparatus 320 includes at least two transmitters, and when each receiver receives a synchronization signal prior to receiving a signal from the transmission apparatus 320, synchronization with the transmission apparatus 320 may be performed.

When the transmission apparatus 320 includes at least two transmitters, each receiver may separate signals of different frequencies using a filter (not shown) and thereby identify a transmitter corresponding to a predetermined frequency.

The calibration apparatus 350 may calculate distances between the receivers, for example, the first receiver 331, the second receiver 332, ..., the n-th receiver 333, and the transmitters, for example, the first transmitter 321, ..., the n-th transmitter 322, by receiving inertia information from the inertia sensor 340, and by receiving intensity information from the receivers during a predetermined period of time, and may calibrate a signal attenuation characteristic of each receiver based on the calculated distances between the receivers and the transmitters.

The calibration apparatus 350 may include an information selector 351, an angle calculator 352, a position calculator 353, a distance calculator 354, a pose calculator 355, and a calibrator 356.

The information selector 351 may receive intensity information of a signal measured by each receiver during a predetermined period of time, may receive inertia information from the remote device 310 during the same predetermined period of time, may select strongest intensity information for each receiver, and may verify inertia information of when the strongest intensity information is received.

For example, a signal received by each of the first receiver 331, the second receiver 332, ..., the n-th receiver 333 during the predetermined period of time may be a signal that is transmitted by the transmitter, for example, the first transmitter 321 during the predetermined period of time while being rotated horizontally or vertically based on a fixed point. When it is difficult for the transmitter to rotate at a single point, it is possible to perform calibration based on a human motion using a simple method.

In general, a human motion may be a rotary motion based on an elbow, a shoulder, and the like. When a light emitter is fixed to face the outside from a rotary center based on a joint of an elbow, a shoulder, and the like, and a human moves, the rotary motion may be performed. In this case, a deviation for the length of arm or upper arm is not generally great. Even though the deviation is great, the deviation may be relatively small compared to a distance between a transmitter and a receiver. Accordingly, using the length of arm or upper arm and a posture value of the transmitter, it is possible to know a position and a rotation center of the transmitter. Using the same method, it is possible to calibrate a signal attenuation characteristic for each distance.

Even though the calibration apparatus 350 is described based on an example that a single transmitter is provided, the number of transmitters may be at least two.

The angle calculator 352 may calculate angles between a transmitter, for example, the first transmitter 321, and vectors of the respective receivers, for example, the first receiver 331, the second receiver 332, . . . , the n-th receiver 333, based on the inertia information verified for each receiver, according to Equation 4.

Figure 4:
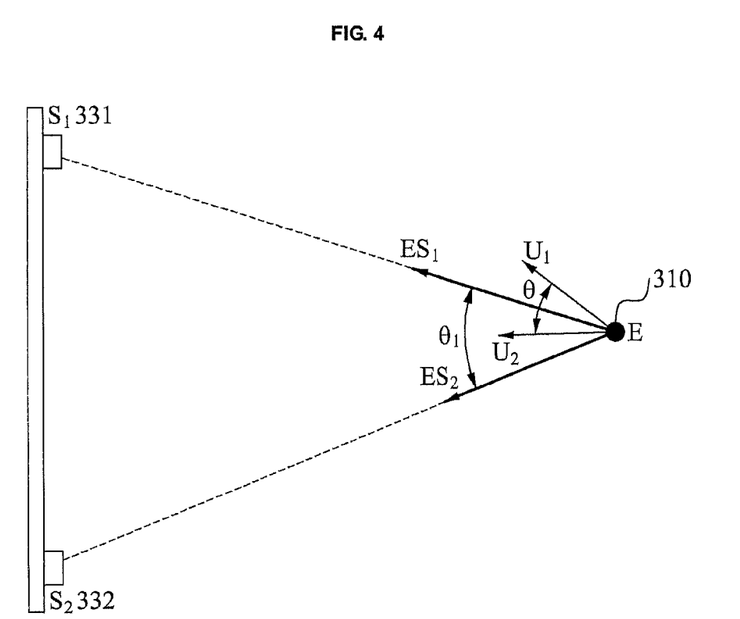
FIG. 4 illustrates an example of measuring an angle between vectors from a transmitter to the respective receivers based on inertia information according to an embodiment.

FIG. 4 illustrates an example of measuring an angle between vectors from a transmitter to the respective receivers based on inertia information according to an embodiment.

Referring to FIG. 4, when the remote device 310 including the first transmitter 321 rotates at E, and when intensity information measured by the first receiver 331 corresponding to a light receiver $S_1$ and intensity information measured by the second receiver 332 corresponding to a light receiver $S_2$ is largest, or when at least one of a signal of a symmetrical point of the intensity information and a center point between both sections at which the intensity information becomes zero is satisfied, the first transmitter 321 of the remote device 310 may face each of the light receivers $S_1$ and $S_2$. Vectors of the above example may be $ES_1$ and $ES_2$. When a direction vector determined based on a reference pose measured by the inertia sensor 340 is $U_1$ for the light receiver $S_1$ and $U_2$ for the light receiver $S_2$, an angle between $U_1$ and $U_2$ may be $\theta_1$, which may be determined according to Equation 5.

$$\theta_1 = a\cos(U_1 \cdot U_2 / |U_1| * |U_2|) \quad \text{[Equation 5]}$$

The position calculator 353 may also calculate a 3D position of the remote device 310 using a triangulation scheme, based on angles between the first transmitter 321 and the respective receivers, for example, the first receiver 331, the second receiver 332, . . . , the n-th receiver 333.

Figure 5:
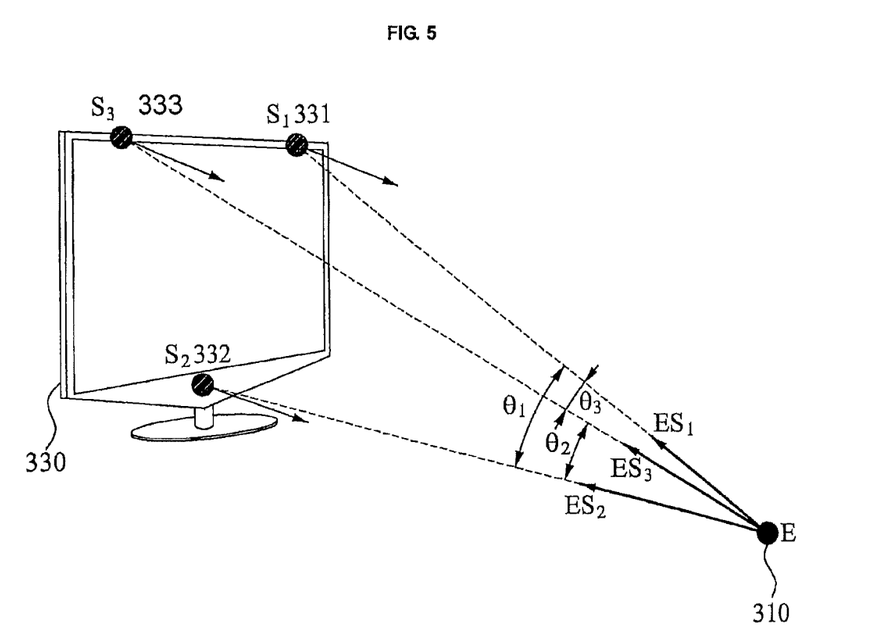
FIG. 5 illustrates an example of estimating a position of a remote device for calibration according to an embodiment.

FIG. 5 illustrates an example of estimating a position of a remote device for calibration according to an embodiment.

Referring to FIG. 5, assuming that the position calculator 353 is aware of positions S1, S2, and S3 of the first receiver 331, the second receiver 332, and the n-th receiver 333, and vectors that connect the positions $S_1$, $S_2$, and $S_3$ and a single spatial point E of the remote device 310 including the first transmitter 321 are $ES_1$, $ES_2$, and $ES_3$, when angles $\theta_1$, $\theta_2$, and $\theta_3$ between the respective vectors are known, the position calculator 353 may calculate a position of E where the remote device 310 is positioned using a triangulation scheme.

The distance calculator 354 may calculate distances between the first transmitter 321 and the respective first receiver 331, second receiver 332, and n-th receiver 333, based on the position of the remote device 310 calculated by the position calculator 353, and the known positions S1, S2, and S3 of the first receiver 331, the second receiver 332, and the n-th receiver 333.

The pose calculator 355 may calculate a pose of the remote device 310 of when the strongest intensity information for each receiver is received, using inertia information of when the strongest intensity information for each receiver is received.

Figure 6:
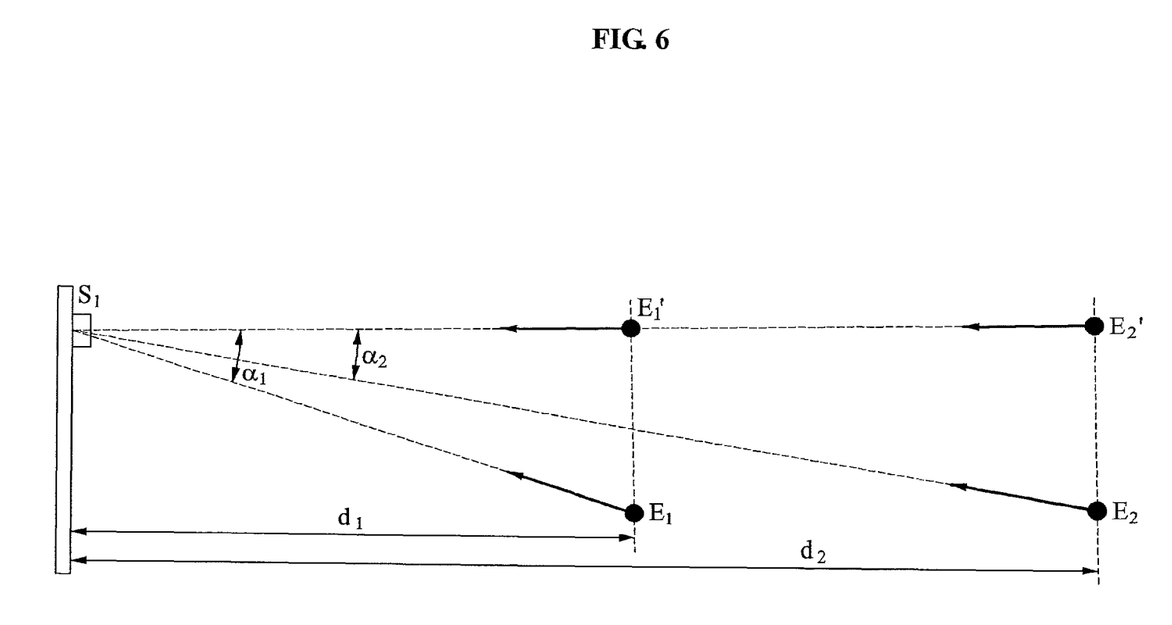
FIG. 6 illustrates an example of calculating intensity of a position of a virtual transmitter that is positioned in a directional direction of a receiver, at a calculated position of a transmitter according to an embodiment.

FIG. 6 illustrates an example of calculating intensity of a position of a virtual transmitter that is positioned in a directional direction of a receiver, at a calculated position of a transmitter according to an embodiment.

Referring to FIG. 6, when intensity information of a signal that is emitted from $E_1$ and is measured by $S_1$ is I1, intensity information I1' of a signal that is emitted from E1', positioned on a virtual line of a directional direction, may be calculated according to I1'=I1*cos(α1). Here, α1 may be calculated based on positions of $S_1$ and $E_1$, and a distance d1 between $S_1$ and $E_1'$ may also be calculated based on positions of a transmitter and a receiver.

Figure 7:
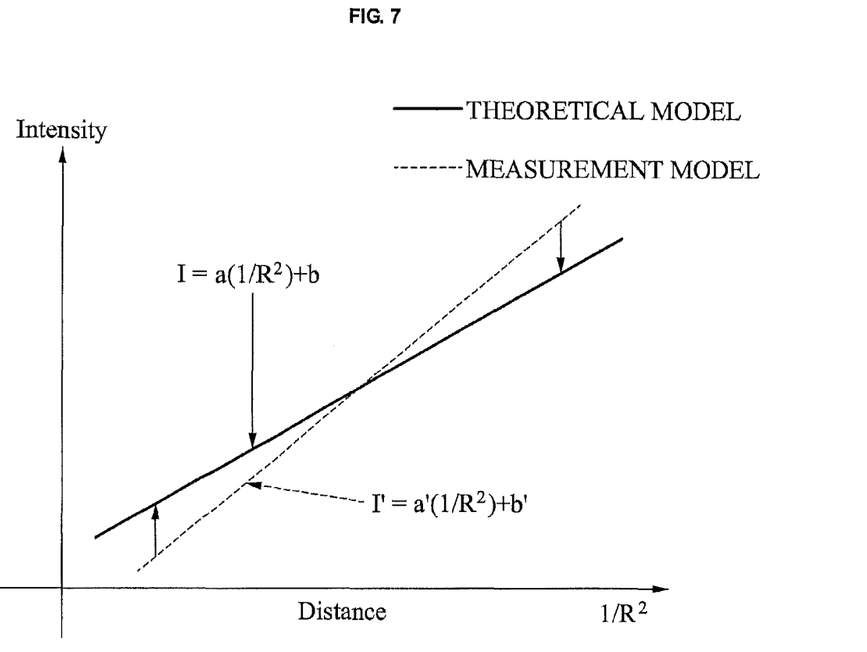
FIG. 7 illustrates an example of a theoretical model and a measurement model of a signal attenuation characteristic for each distance according to an embodiment.

The calibrator 356 may measure strongest intensity information of each receiver and distances between the transmitter, for example, the first transmitter 321, and the respective receivers, for example, the respective first receiver 331, second receiver 332, and n-th receiver 333 at least twice at different positions, and may calibrate a signal attenuation apparatus of each receiver based on the strongest intensity and the distances as shown in FIG. 7.

FIG. 7 illustrates an example of a theoretical model and a measurement model of a signal attenuation characteristic for each distance according to an embodiment.

Referring to FIG. 7, the theoretical model of the signal attenuation characteristic for each distance may be expressed by $I=a(1/R^2)+b$. Referring to the equation, intensity information I may be in proportion to 1/R2 and to a scale factor a, and may be added with an offset b. Here, 1/R2 is a physical characteristic of light and thus, may linearly appear even in an actual measurement. Accordingly, there is no need to perform calibration. However, the remaining parameters, that is, the scale factor a and the offset b may be different for each light receiver due to a performance deviation between receivers, a decrease in the efficiency of the transmitter, affect of a surrounding environment, and the like. Accordingly, the measurement model of the signal attenuation characteristic for each distance may need to be calibrated to the theoretical model by correcting the parameters.

An attenuation characteristic model for each distance is a function that may be expressed as a linear expression and thus, may correct and calibrate a scalar factor and an offset by measuring a distance value between the transmitter and each of at least two linear points directed by a receiver, and intensity information corresponding to the measured distance value.

The calibrator 356 may calibrate a signal attenuation characteristic of each receiver, for example, the first receiver 331, the second receiver 332, . . . , the n-th receiver 333, based on the signal attenuation characteristic that varies based on an angle, using the posture of the remote device 310.

Hereinafter, a method of calibrating a signal attenuation characteristic difference in a calibration apparatus of a 3D position and direction estimation system constructed as above will be described with reference to FIG. 8.

Figure 8:
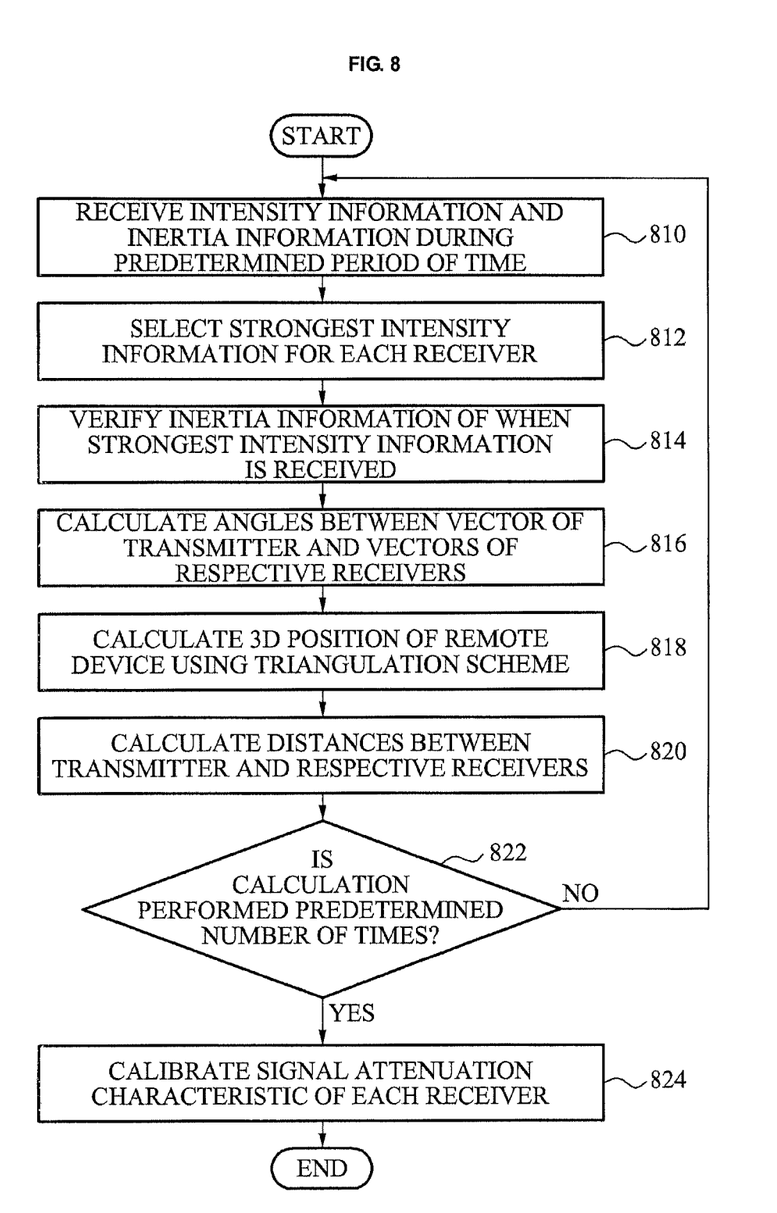
FIG. 8 illustrates a method of calibrating a signal attenuation characteristic difference occurring due to performance deviation for each receiver according to an embodiment.

FIG. 8 illustrates a method of calibrating a signal attenuation characteristic difference occurring due to performance deviation for each receiver according to an embodiment.

Referring to FIG. 8, in operation 810, a calibration apparatus may receive intensity information of a signal measured by each receiver during a predetermined period of time, and may receive inertia information from a remote device during the same predetermined period of time.

In operation 812, the calibration apparatus may select strongest intensity information for each receiver.

In operation 814, the calibration apparatus may verify inertia information of when the strongest intensity information is received.

In operation 816, the calibration apparatus may calculate angles between a vector of a transmitter and vectors of the respective receivers based on the inertia information verified for each receiver.

In operation 818, the calibration apparatus may calculate a 3D position of the remote device using a triangulation scheme based on the angles between the vectors.

In operation 820, the calibration apparatus may calculate distances between the transmitter and the respective receivers.

In operation 822, the calibration apparatus may verify whether calculation of the strongest intensity information of each receiver and the distances between the transmitter and the respective receivers is performed a predetermined number of times.

When the calculation of the strongest intensity information and the distance is not performed the predetermined number of times, the calibration apparatus may return to operation 810 and may repeat operations 810 through 820. In this case, a position of the remote device may be different from a previous position.

On the contrary, when the calculation of the strongest intensity information and the distance is performed the predetermined number of times, the calibration apparatus may calibrate a signal attenuation characteristic of each receiver based on the strongest intensity information of each receiver and information about the distances between the transmitter and the respective receivers that are measured a predetermined number of times at different positions in operation 824.

According to embodiments, there may be provided an apparatus and method that may calibrate a signal attenuation characteristic difference occurring due to a performance deviation for each receiver, prior to estimating a 3D position and a direction using a signal attenuation characteristic, and may thereby compensate for non-uniformity of position and direction estimation performance. Accordingly, it is possible to readily calibrate a performance deviation between a sensor and an apparatus, which may occur during a mass production or a product creation process, and to secure the stable sensing performance.

Processes, functions, methods, and/or software in apparatuses described herein may be recorded, stored, or fixed in one or more non-transitory computer-readable storage media (computer readable recording medium) that includes program instructions (computer readable instructions) to be implemented by a computer to cause one or more processors to execute or perform the program instructions. The media may also include, alone or in combination with the program instructions, data files, data structures, and the like. The media and program instructions may be those specially designed and constructed, or they may be of the kind well-known and available to those having skill in the computer software arts. Examples of non-transitory computer-readable storage media include magnetic media, such as hard disks, floppy disks, and magnetic tape; optical media such as CD ROM disks and DVDs; magneto-optical media, such as optical disks; and hardware devices that are specially configured to store and perform program instructions, such as read-only memory (ROM), random access memory (RAM), flash memory, and the like. Examples of program instructions include machine code, such as produced by a compiler, and files containing higher level code that may be executed by the computer using an interpreter. The described hardware devices may be configured to act as one or more software modules that are recorded, stored, or fixed in one or more computer-readable storage media, in order to perform the operations and methods described above, or vice versa. In addition, a non-transitory computer-readable storage medium may be distributed among computer systems connected through a network and computer-readable codes or program instructions may be stored and executed in a decentralized manner. In addition, the computer-readable storage media may also be embodied in at least one application specific integrated circuit (ASIC) or Field Programmable Gate Array (FPGA).

Although embodiments have been shown and described, it would be appreciated by those skilled in the art that changes may be made in these embodiments without departing from the principles and spirit of the disclosure, the scope of which is defined by the claims and their equivalents.

What is claimed is:

1. A calibration apparatus for calibrating a signal attenuation characteristic of receivers in a three-dimensional (3D) position and direction estimation system, the calibration apparatus comprising:
    an information selector configured to receive intensity information of a signal transmitted by a directional transmitter, in the 3D position and direction estimation system, being rotated based on a fixed point during a predetermined period of time and measured by each receiver during the predetermined period of time, to receive inertia information from a remote device during the same predetermined period of time, to identify intensity maxima for each receiver, and to establish a correlation between the inertia information and the intensity maxima;
    at least one memory and at least one processor programmed to
        calculate angles between a vector of the transmitter and vectors of the respective receivers based on the correlated inertia information for each receiver,
        calculate a 3D position of the remote device using a triangulation scheme based on the angles between the vector of the transmitter and the vectors of the respective receivers,
        calculate distances between the transmitter and the respective receivers, and,
        calibrate the signal attenuation characteristic of each receiver based on the intensity maxima of each receiver and information about the distances between the transmitter and the respective receivers.

2. The calibration apparatus of claim 1, wherein the signal received by each receiver during the predetermined period of time is a signal that is transmitted by the transmitter during the predetermined period of time while the remote device is rotated horizontally or vertically about a fixed point.

3. The calibration apparatus of claim 1, further comprising:
    a posture calculator to calculate an orientation of the remote device when the intensity maxima for each receiver is received, based on inertia information of the remote device when the intensity maxima for each receiver is received,
    wherein when calibrating the signal attenuation characteristic of each receiver, the calibrator uses a signal attenuation characteristic that varies based on an angle, using the orientation of the remote device.

4. The calibration apparatus of claim 1, wherein at least three receivers are provided.

5. The calibration apparatus of claim 1, wherein the remote device comprises an inertia sensor to measure the inertia information, and comprises either the transmitter or the receivers.

6. The calibration apparatus of claim 1, wherein the intensity information comprises an intensity value of an optical signal that is emitted at a predetermined wavelength, or magnitude of an electromagnetic field.

7. The calibration apparatus of claim 1, wherein the inertia information comprises at least one of motion acceleration of three axes, gravity acceleration of the three axes, and angular speed of the three axes that are measured using an inertia sensor.

8. A calibration apparatus for calibrating a signal attenuation characteristic of receivers in a three-dimensional (3D) position and direction estimation system, the calibration apparatus comprising:

an information selector configured to receive intensity information of a signal transmitted by first and second directional transmitters, in the 3D position and direction estimation system, being rotated based on a fixed point during a predetermined period of time and measured by each receiver during the predetermined period of time, to receive inertia information from a remote device during the same predetermined period of time, to identify intensity maxima for each receiver, and to establish a correlation between inertia information and the intensity maxima;

at least memory and at least one processor programmed to
calculate angles between a vector of the first transmitter and vectors of the respective receivers based on the correlated inertia information for each receiver and between a vector of the second transmitter and vectors of the respective receivers based on the correlated inertia information for each receiver,
calculate a 3D position of the remote device using a triangulation scheme based on the angles between the first vector of the transmitter and the vectors of the respective receivers and the second vector of the transmitter and the vectors of the respective receivers;
calculate distances between the first transmitter and the respective receivers and distances between the second transmitter and the respective receivers; and,
calibrate the signal attenuation characteristic of each receiver based on the intensity maxima of each receiver and information about the distances between the first and second transmitters and the respective receivers.

9. A calibration method for calibrating a signal attenuation characteristic of receivers in a calibration apparatus of a three-dimensional (3D) position and direction estimation system, the method comprising:

receiving intensity information of a signal transmitted by a directional transmitter, in the 3D position and direction estimation system, being rotated based on a fixed point during a predetermined period of time and measured by each receiver during the predetermined period of time, and receiving inertia information from a remote device during the same predetermined period of time;

identifying intensity maxima for each receiver;

establishing a correlation between inertia information and the intensity maxima;

calculating, using at least one memory and at least one processor,
angles between a vector of a transmitter and vectors of the respective receivers based on the correlated inertia information for each receiver,
a 3D position of the remote device using a triangulation scheme based on the angles between the vectors, and distances between the transmitter and the respective receivers; and, calibrating, using the at least one memory and the at least one processor, the signal attenuation characteristic of each receiver based on the intensity maxima of each receiver and information about the distances between the transmitter and the respective receivers.

10. The method of claim 9, wherein the signal received by each receiver during the predetermined period of time is a signal that is transmitted by the transmitter during the predetermined period of time while the remote device is rotated horizontally or vertically about a fixed point.

11. The method of claim 9, further comprising:
calculating an orientation of the remote device when the intensity maxima for each receiver is received, based on inertia information when the intensity maxima for each receiver is received,
wherein the calibrating comprises using a signal attenuation characteristic that varies based on an angle using the orientation of the remote device, when calibrating the signal attenuation characteristic of each receiver.

12. At least one non-transitory computer-readable medium storing computer readable instructions that control at least one processor to implement the method of claim 9.

13. A system for estimating a three-dimensional (3D) position and a direction, the system comprising:
a transmission apparatus comprising at least one directional transmitter configured to transmit a directional signal which varies based on an angle of emission for directional intensity measurement;
a reception apparatus comprising at least three receivers configured to receive the directional signal and to continuously measure intensity of the signal, and to output intensity information;
a remote device comprising an inertia sensor configured to measure inertia information, and comprising one of the transmission apparatus and the reception apparatus; and
a calibration apparatus comprising at least one memory and at least one processor programmed to
receive the inertia information and the intensity information during a predetermined period of time,
correlate the intensity information and the inertia information,
calculate distances between the at least one transmitter and the at least three receivers, and
calibrate a signal attenuation characteristic of each receiver based on the distances between the at least one transmitter and the at least three receivers,
wherein the at least one directional transmitter is rotated based on a fixed point during the predetermined period of time.

14. The system of claim 13, wherein the calibration apparatus comprises:
an information selector to receive intensity information of a signal measured by each receiver during a predetermined period of time, to receive inertia information from the remote device during the same period of time, to identify intensity maxima for each receiver, and to correlate inertia information with the intensity maxima;
an angle calculator to calculate angles between a vector of the at least one transmitter and vectors of the at least three receiver based on the correlated inertia information for each receiver;
a position calculator to calculate a 3D position of the remote device using a triangulation scheme based on the angles between the vectors;
a distance calculator to calculate distances between the at least one transmitter and the at least three receivers; and
a calibrator to calibrate the signal attenuation characteristic of each receiver based on the intensity maxima of each of the three receivers and the calculated distances between the at least one transmitter and the at least three receivers.

15. The system of claim 14, wherein the signal received by each receiver during the predetermined period of time is a signal that is transmitted by the at least one transmitter during the predetermined period of time while the remote device is rotated horizontally or vertically about a fixed point.

16. The system of claim 14, wherein the calibrator calibrates the signal attenuation characteristic of each receiver based on the intensity maxima of each receiver and information about the distances between the at least one transmitter and the at least three receivers that are measured at least twice at different positions.

17. The system of claim 14, further comprising:
a posture calculator to calculate an orientation of the remote device when the intensity maxima for each receiver is received, based on correlated inertia information of the remote device when the intensity maxima for each receiver is received,
wherein when calibrating the signal attenuation characteristic of each receiver, the calibrator uses a signal attenuation characteristic that varies based on an angle, using the orientation of the remote device.

18. The system of claim 13, wherein the at least three receivers are disposed in different directions in angularly offset manner.

19. The system of claim 13, wherein at least two transmitters are disposed in different directions.

20. A calibration method for calibrating a signal attenuation characteristic in a calibration apparatus of a three-dimensional (3D) position and direction estimation system, the method comprising:

receiving intensity information of a signal transmitted by a directional transmitter, in the 3D position and direction estimation system, being rotated based on a fixed point during a predetermined period of time and measured by each receiver in the 3D position and direction estimation system during the predetermined period of time, and receiving inertia information from a remote device during the same predetermined period of time;

identifying intensity maxima for each receiver;

correlating inertia information with the intensity maxima;

calculating, using at least one memory and at least one processor,
angles between a vector of a first transmitter and vectors of the respective receivers based on the inertia information verified for each receiver,
angles between a vector of a second transmitter and vectors of the respective receivers based on the inertia information verified for each receiver,
a 3D position of the remote device using a triangulation scheme based on the angles between the vectors, and
distances between the transmitter and the respective receivers; and calibrating the signal attenuation characteristic of each receiver based on the intensity maxima of each receiver and information about the distances between the transmitter and the respective receivers.

21. At least one non-transitory computer-readable medium storing computer readable instructions that control at least one processor to implement the method of claim 20.

* * * * *